Patented Nov. 1, 1932

1,885,888

UNITED STATES PATENT OFFICE

GEORGE D. BEAL AND ROB ROY McGREGOR, OF PITTSBURGH, PENNSYLVANIA, ASSIGNORS TO MELLON INSTITUTE OF INDUSTRIAL RESEARCH, A CORPORATION OF PENNSYLVANIA, TRUSTEE

METHOD OF CARROTING FUR

No Drawing.   Application filed November 7, 1930. Serial No. 494,181.

Our invention relates to the treatment of animal fibers, such as fur, in preparation for its manufacture into felt. It has been developed in the treatment of fur, and in that application we shall describe it. The objects in view are improvement in the quality of the product, reduction in the cost of production, and avoidance of manufacturing conditions such as to affect the health of operatives. The preponderant use for fur felt is in the making of hats.

For the preparation of fur for felt manufacture it has long been the practice to treat rabbit, hare, beaver, and similar types of fur with a solution of mercuric nitrate in nitric acid, either while still on the pelt or after removal therefrom. The fur is then dried at temperatures ranging from room temperature to as high as 250° F., depending upon the nature of the fur and the type of final product desired. The process is known as carroting.

There are certain disadvantages connected with the process, among which the most obvious are the toxicity of the mercury and the discoloration effected by the nitric acid; also, varying results are obtained under varying atmospheric conditions, due to the fact that the nitric acid is volatile. This property of nitric acid results in a quick evaporation of the nitric acid on days of low relative humidity and slow evaporation on days of high relative humidity. On days of low relative humidity much of the nitric acid may evaporate before reacting with the fur, and on days of high relative humidity the time of reaction of the acid with the fur may be so greatly prolonged as to give a decidedly yellow color to the fur, regardless of the temperature of drying.

It is evident that there is a need for a carroting solution which will do away with the difficulties consequent upon the use both of mercury and of nitric acid.

We have made an extensive study of the reactions of carroting solutions upon fur, and have found that, in order to obtain the best results, two reactions must take place. The first reaction is that of oxidation, and in the mercuricnitrate-nitric-acid solution this reaction is carried out by the mercury catalytically and by the nitric acid by direct oxidation. The second reaction is that of hydrolysis of the fur, to allow the oxidizing agent to penetrate and to carry out its function more readily and completely. In the solution in common use this function devolves on the nitric acid. But this acid is far from being consistent, due to the fact that part of it is expended in oxidation and nitration, and its time of contact with the fur varies according to the temperature of drying and according to the degree of humidity of the atmosphere.

We have found as a result of many experiments that neither oxidation alone or hydrolysis alone is sufficient to give a good carroting effect. The use of hydrogen peroxide, or of potassium permanganate, or of similar oxidizing agents, does give a certain carroting effect, but not nearly sufficient to be of commercial value. Hydrolysis by the use of sulphuric acid, or of hydrochloric acid, or of steam under pressure, also achieves a certain carroting effect, but not sufficient to be of commercial value. The combination of these two reactions, however, brings about a carroting reaction which is complete and which affords a carroted fur capable of being worked faster and of better quality than fur treated with mercury solution. The improvement of our process upon the mercury solution process is, without doubt, due to our use of a proper hydrolyzing agent.

We have found that the best results are obtained by the use of an oxidizing agent which is readily available, accompanied by a hydrolyzing acid which is not volatile at the temperature at which the carroted fur is dried, and which is not consumed by the fur substance through oxidation reactions on the part of these acids at temperatures not exceeding the temperatures at which the fur is dried.

As oxidizing agent we use hydrogen peroxide. As hydrolyzing agent we may use such acids as sulphuric, or phosphoric, or any highly ionized acid which is not volatile at the temperature of drying and which may not be consumed by side reactions during the processing. We prefer to use sulphuric acid.

We recognize the fact that hydrogen peroxide alone has been proposed as a carroting solution, also hydrogen peroxide with catalysts to promote the oxidizing effects, as well as hydrogen peroxide with alkalies. None of these gives the complete effect desired. Hydrogen peroxide alone is not nearly active enough for the purpose; the addition of catalysts assists the oxidation, but from our studies we believe that the lack of a hydrolytic agent is a serious detriment. The addition of an alkali has undoubtedly a hydrolytic effect, but its action is too harsh. Moreover, it is frequently found that furs which have been carroted with alkalies (with or without hydrogen peroxide) must be felted down in a more or less continuous operation. Allowing the partially felted material to stand overnight frequently robs it of the ability to felt further. We believe that an explanation for this is to be found in the fact that the isoelectric point of fur is in the neighborhood of a pH of 5. The alkaline carrot is so far removed from this that probably an unusual amount of swelling of the fiber takes place, resulting in a harshness and a weakening of the fiber. Further than this, the hydrolytic effect of alkalies upon proteins is much more vigorous than that of acids and is, consequently, more difficult of control. The acid carrot, having a pH closer to that of the isoelectric point of the fur than an alkaline carrot, causes less swelling and therefore avoids the development of harshness, while the gentler hydrolytic effect is much more susceptible to control.

Whether this be the true explanation or not, we have demonstrated that fur prepared with an acid as the hydrolytic agent has the advantage of producing a finer feeling felt and also of allowing felting to be completed in other than a continuous operation.

As an example of our method, we prepare a 10% solution of hydrogen peroxide (by dilution of the commercial 30% product) and add to this an equal volume of 2-normal sulphuric acid. The solution is then ready to be applied to the fur.

After the fur has been treated it is dried, the fur removed from the pelt, and it is then ready for the operations of blowing and hat-making. The fur so prepared has been found to work as well as mercury-carroted fur, and in the practice of our invention we have found that it is possible to maintain more nearly the natural color of the fur than in the practice of the mercury-carroting process.

The concentration of hydrogen peroxide and sulphuric acid may vary widely, according to the nature of the fur being treated and to the method of drying. The percentage of hydrogen peroxide in the final solution may vary from 2% to 10% and of the sulphuric acid from 0.3 normal to 1.5 normal. Different types of fur and different types of drying call for different concentrations both of hydrogen peroxide and of sulphuric acid; and, within the limits named, the best proportions may be found only by test.

Inasmuch as hydrogen peroxide may be produced by the decomposition of certain per salts of alkalies and alkaline-earth metals such as perborates and percarbonates and by the decomposition of alkalies and alkaline-earth peroxides with acids, we may choose to use such salts and peroxides together with sulfuric acid to produce the same effect upon the fur. We may also choose to use organic peroxides as the oxidizing agent together with our non-volatile acid.

We claim as our invention:

The method herein described of simultaneously hydrolyzing and oxidizing fur fiber in preparation for felting which consists in treating the fiber with a solution containing hydrogen peroxide in concentration ranging from 2 to 10 per cent. and sulphuric acid in concentration ranging from 0.3 normal to 1.5 normal.

In testimony whereof we have hereunto set our hands.

GEORGE D. BEAL.
ROB ROY McGREGOR.